United States Patent
Tanaka

(10) Patent No.: US 9,569,852 B2
(45) Date of Patent: Feb. 14, 2017

(54) ALIGNMENT METHOD

(71) Applicant: DISCO CORPORATION, Tokyo (JP)

(72) Inventor: Makoto Tanaka, Tokyo (JP)

(73) Assignee: Disco Corporation, Tokyo (JP)

(*) Notice: Subject to any disclaimer, the term of this patent is extended or adjusted under 35 U.S.C. 154(b) by 0 days.

(21) Appl. No.: 15/004,554

(22) Filed: Jan. 22, 2016

(65) Prior Publication Data

US 2016/0225134 A1 Aug. 4, 2016

(30) Foreign Application Priority Data

Jan. 29, 2015 (JP) ................................ 2015-015081

(51) Int. Cl.
G06T 7/00 (2006.01)
B23K 26/00 (2014.01)

(52) U.S. Cl.
CPC ............. *G06T 7/0044* (2013.01); *B23K 26/00* (2013.01); *G06T 2207/30164* (2013.01); *G06T 2207/30204* (2013.01)

(58) Field of Classification Search
CPC ................... G06T 7/0044; G06T 2207/30164; G06T 2207/30204; B23K 26/00
See application file for complete search history.

(56) References Cited

U.S. PATENT DOCUMENTS

2002/0025616 A1* 2/2002 Kamigaki ............ B23D 59/001
438/200

FOREIGN PATENT DOCUMENTS

JP 2002-033295 1/2002

* cited by examiner

*Primary Examiner* — Siamak Harandi
*Assistant Examiner* — Amandeep Saini
(74) *Attorney, Agent, or Firm* — Greer Burns & Crain Ltd.

(57) ABSTRACT

An alignment method includes: a storage step that images a first workpiece on a chuck table and stores positions of alignment marks corresponding to scheduled division lines and positional relationships of the division lines with the alignment marks; a holding step that holds a second workpiece with the chuck table; a detection step that images positions of the alignment marks on the second workpiece, the positions corresponding to the stored alignment mark positions, and detects the alignment marks of the second workpiece; and an identification step that identifies positions of scheduled division lines of the second workpiece on the basis of the detected positions of the alignment marks of the second workpiece and the stored positional relationships. If one of the alignment marks of the second workpiece cannot be detected at one of the stored alignment mark positions, the detection step detects other adjacent alignment marks.

1 Claim, 3 Drawing Sheets

ALIGNMENT METHOD

BACKGROUND OF THE INVENTION

Field of the Invention

The present invention relates to an alignment method for adjusting a machining position during machining of a plate-shaped workpiece.

Description of the Related Art

A ceramic or resin substrate having an electronic device in each of areas on the front face side thereof partitioned by scheduled division lines is machined by a machining device that includes a cutting blade or a laser irradiation unit, thus being divided into a plurality of device chips each corresponding to the electronic device.

Incidentally, a workpiece such as ceramic or resin substrate may be slightly deformed due, for example, to heat during manufacture. Electronic devices are damaged if the deformed workpiece is machined according to the design value. Therefore, an identification mark (alignment mark) corresponding to each scheduled division line is provided on the workpiece to identify the scheduled division line even in the event of deformation of the workpiece (refer, for example, to Japanese Patent Laid-Open No. 2002-33295).

SUMMARY OF THE INVENTION

However, not all alignment marks can be necessarily uniformly and clearly formed. If alignment marks cannot be detected properly by the machining device due to failure to form these marks uniformly and clearly, it is common that the machining device must be stopped for manual identification of the machining position performed by an operator. Thus, the conventional alignment method leads to significant reduction in productivity if alignment marks cannot be detected properly.

In light of the foregoing, it is an object of the present invention to provide an alignment method that keeps reduction in productivity to a minimum.

In accordance with an aspect of the present invention, there is provided an alignment method for identifying positions of first scheduled division lines on a workpiece provided with devices each formed in each of areas partitioned by a plurality of first scheduled division lines and a plurality of second scheduled division lines that intersect the first scheduled division lines, by detecting alignment marks each arranged in each of the areas. The alignment method includes a storage step, a holding step, a detection step, and an identification step. The storage step images a first workpiece held by a chuck table and stores positions of the alignment marks corresponding to the first scheduled division lines and relationships of the first scheduled division lines with the alignment marks. The holding step holds a second workpiece corresponding to the first workpiece with the chuck table after the storage step. The detection step images positions of the alignment marks on the second workpiece, the positions corresponding to the alignment mark positions stored in the storage step, after the holding step, and detects the alignment marks of the second workpiece. The identification step identifies positions of the first scheduled division lines of the second workpiece after the detection step on the basis of the detected positions of the alignment marks of the second workpiece and the positional relationships of the first scheduled division lines with the alignment marks, the positional relationships being stored in the storage step. If one of the alignment marks of the second workpiece cannot be detected at one of the alignment mark positions stored in the storage step, other adjacent one of the alignment marks on the center side of the second workpiece along the direction of extension of the first scheduled division lines is detected in the detection step.

If one of the alignment marks on the second workpiece cannot be detected at one of the given positions stored in the storage step, other adjacent one of the alignment marks on the center side of the second workpiece along the direction of extension of the first scheduled division lines is detected in the alignment method according to the present invention, thus enhancing the likelihood of detection of the alignment marks and keeping reduction in productivity to a minimum.

The above and other objects, features and advantages of the present invention and the manner of realizing them will become more apparent, and the invention itself will best be understood from a study of the following description and appended claim with reference to the attached drawings showing a preferred embodiment of the invention.

DETAILED DESCRIPTION OF THE PREFERRED EMBODIMENT

A detailed description will be given below of an embodiment of the present invention with reference to the accompanying drawings. The alignment method according to the present embodiment includes a storage step (refer to FIG. 2), a holding step, a detection step (refer to FIG. 3), and an identification step. The storage step causes a chuck table of a machining device to hold a registration workpiece (first workpiece) and images the workpiece, and stores alignment mark positions and positional relationships of scheduled division lines (streets) with the alignment marks. The holding step causes the chuck table to hold a machining workpiece (second workpiece). The detection step images, with a camera, positions of the alignment marks on the machining workpiece, the positions corresponding to the alignment mark positions stored in the storage step, and detects the alignment marks on the machining workpiece. If, at this time, one of the alignment marks cannot be detected at one of the alignment mark positions stored in the storage step, other one of the alignment marks is detected at other adjacent one of the positions on the center side of the machining workpiece along the direction of extension of the scheduled division lines. The identification step identifies the positions of the scheduled division lines of the machining workpiece on the basis of the detected positions of the alignment marks of the machining workpiece and the positional relationships of the scheduled division lines with the alignment marks, the positional relationships being stored in the storage step. The alignment method according to the present embodiment will be described below in detail.

Figure 1:
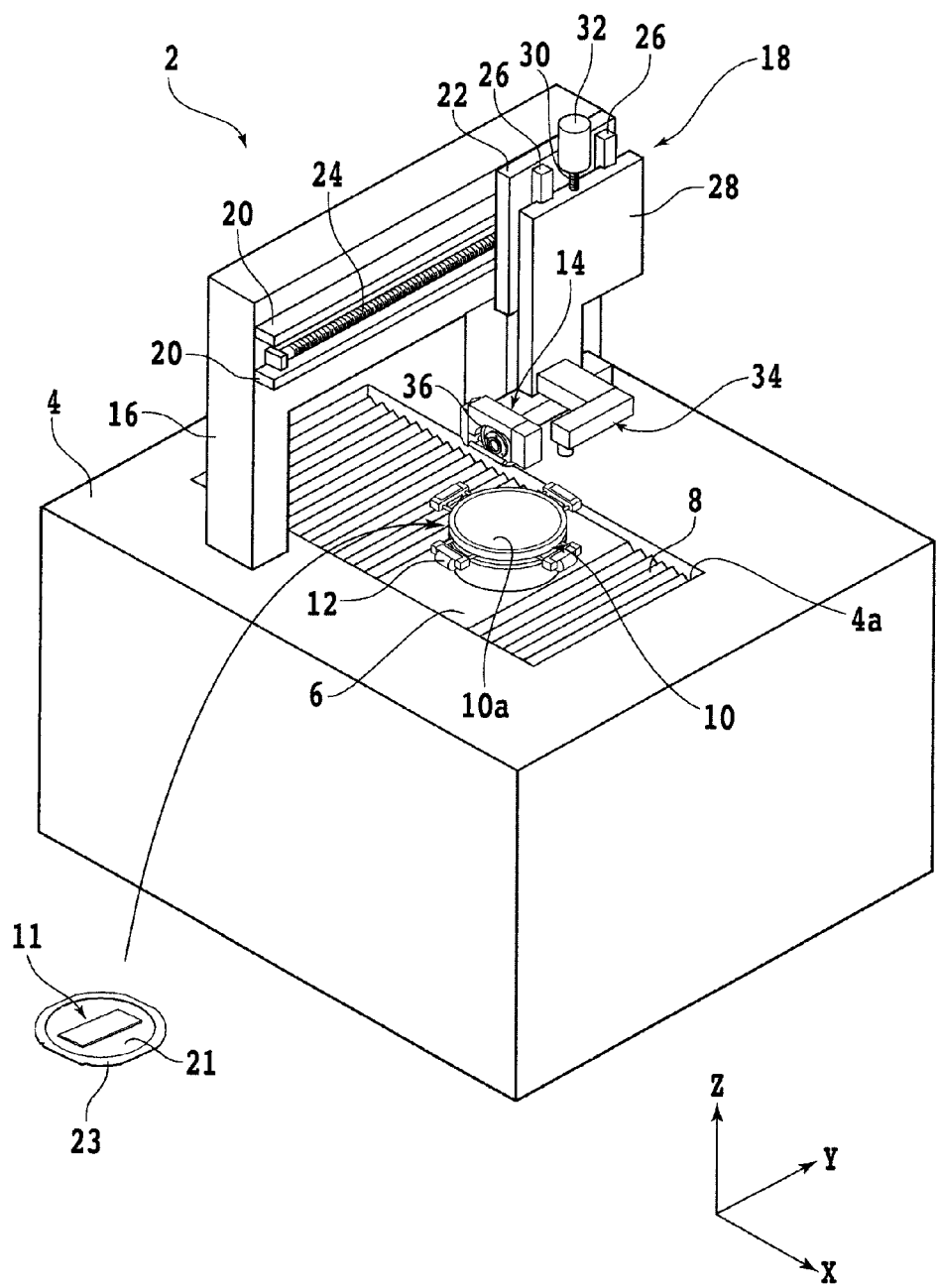
FIG. 1 is a perspective view schematically illustrating a machining device which uses the alignment method according to the present embodiment.

A description will be given first of a machining device which uses the alignment method according to the present embodiment. FIG. 1 is a perspective view schematically illustrating the machining device according to the present embodiment. It should be noted that although a machining device (cutting device) adapted to machine a workpiece using a cutting blade will be described in the present embodiment, the alignment method according to the present invention may be used, for example, in a machining device adapted to irradiate a laser beam onto a workpiece (laser machining device). As illustrated in FIG. 1, a machining device 2 includes a base 4 that supports each structure. A rectangular opening 4a that is long in the X-axis direction (back and forth directions or feed direction for machining) is formed on the top face of the base 4. An X-axis movement table 6, an X-axis movement mechanism (not shown), and a dust- and drip-proof cover 8, are provided inside the opening 4a. The X-axis movement mechanism moves the X-axis movement table 6 in the X-axis direction. The cover 8 covers the X-axis movement mechanism.

The X-axis movement mechanism includes a pair of X-axis guide rails (not shown) that run parallel to the X-axis direction. The X-axis movement table 6 is arranged on the X-axis guide rails in a slidable manner. A nut section (not shown) is provided on the back face side of the X-axis movement table 6. An X-axis ball screw that runs parallel to the X-axis guide rails is screwed into the nut section. The X-axis ball screw has its one end portion coupled to an X-axis pulse motor (not shown). As the X-axis ball screw is rotated by the X-axis pulse motor, the X-axis movement table 6 moves in the X-axis direction along the X-axis guide rails. A chuck table 10 is provided on the X-axis movement table 6 to suck and hold a plate-shaped workpiece 11.

Figure 2:
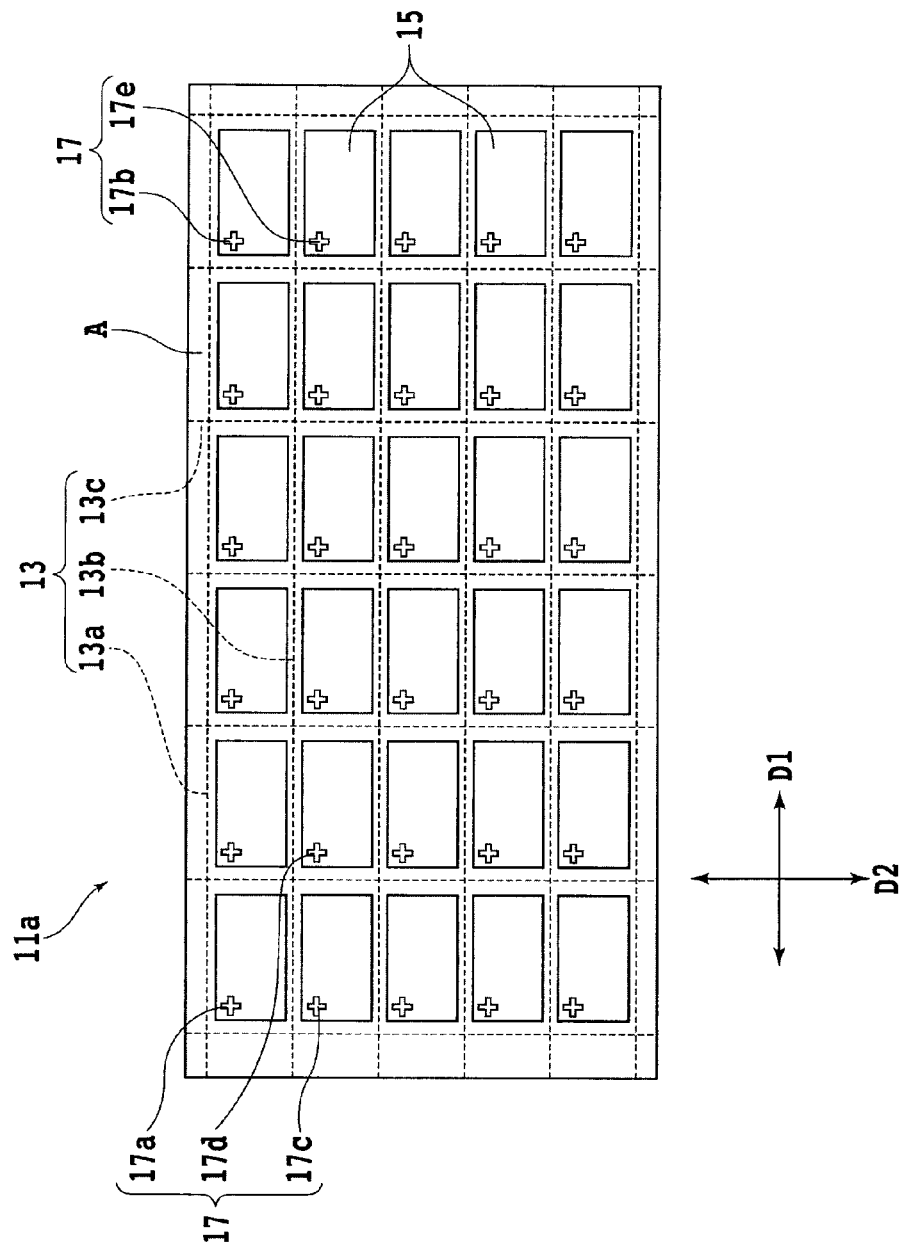
FIG. 2 is a plan view schematically illustrating a registration workpiece.
Figure 3:
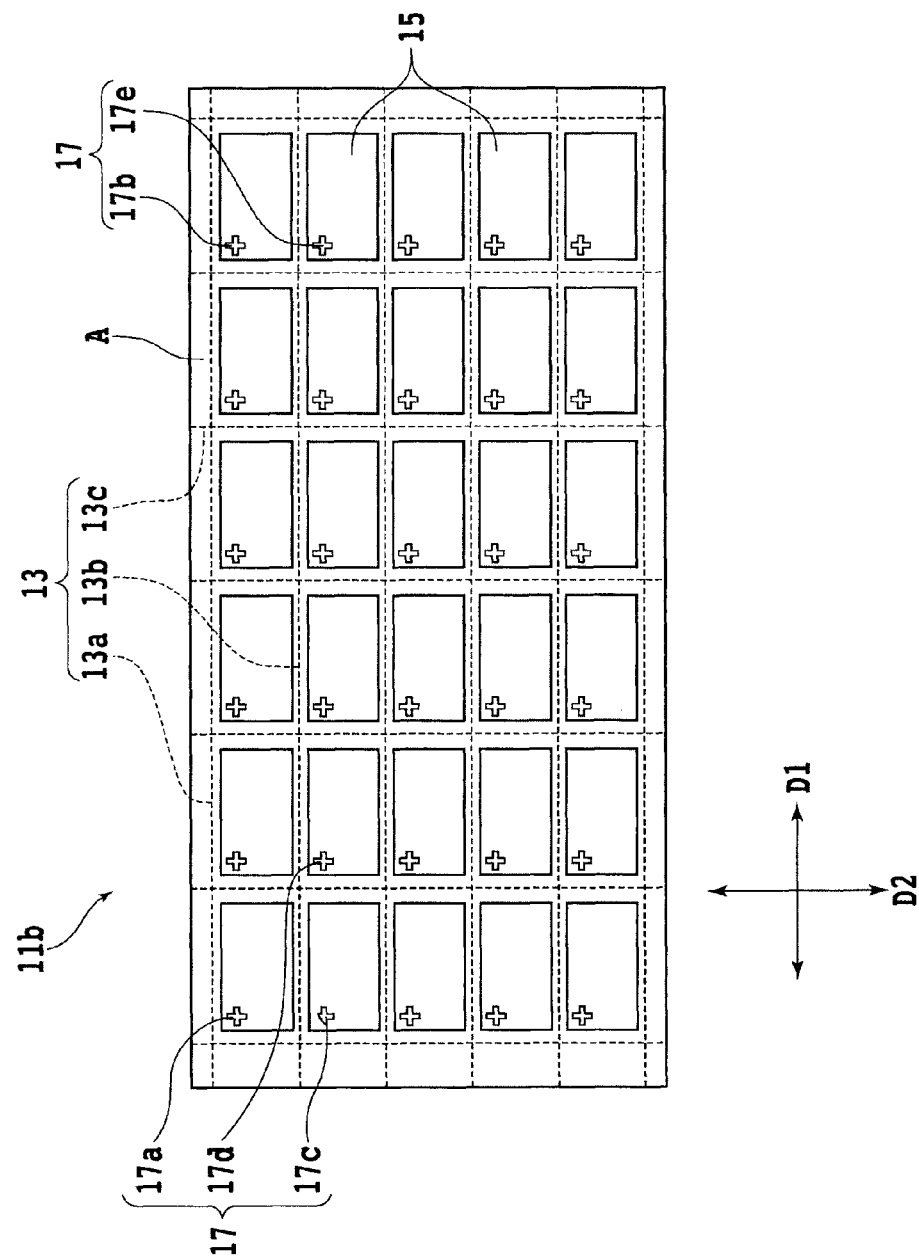
FIG. 3 is a plan view schematically illustrating a machining workpiece.

FIG. 2 is a plan view schematically illustrating a registration workpiece (first workpiece) 11a used in the present embodiment. FIG. 3 is a plan view schematically illustrating a machining workpiece (second workpiece) 11b. As illustrated in FIGS. 2 and 3, the workpieces 11 (the registration workpiece 11a and the machining workpiece 11b) are, for example, rectangular ceramic, resin, or semiconductor substrates, with the side of a front face A partitioned into a plurality of areas by a plurality of scheduled division lines (streets) that are arranged in a grid pattern. More specifically, the side of the front face A of the workpiece 11 is partitioned into a plurality of areas by the plurality of scheduled division lines 13 (e.g., first scheduled division lines 13a and 13b) extending in a first direction D1 and the plurality of scheduled division lines 13 (e.g., second scheduled division line 13c) extending in a second direction D2 that intersects the first direction D1. A device 15 such as IC or LED is provided in each of the areas. Further, an alignment mark 17 in a characteristic shape is arranged in each of the devices 15. On the other hand, adhesive tape 21 is applied to the rear face side of the workpiece 11, with an annular frame 23 fastened to the peripheral portion of the adhesive tape 21.

The front face (top face) of the chuck table 10 is a holding face 10a adapted to suck and hold the workpiece 11 via the adhesive tape 21. The holding face 10a is connected to a suction source (not shown) via a channel (not shown) formed inside the chuck table 10. A rotation mechanism (not shown) is provided under the chuck table 10. The chuck table 10 rotates about a rotation shaft that runs parallel to the Z-axis direction (vertically) because of the rotation mechanism. Further, the chuck table 10 is fed for machining in the X-axis direction by the X-axis movement mechanism. Still further, four clamps 12 are provided around the chuck table 10 to grip and fasten the annular frame 23 from four directions.

A gate-shaped support structure 16 that supports a cutting unit 14 adapted to cut the workpiece 11 is arranged on the top face of the base 4 in such a manner as to straddle the opening 4a. A cutting unit movement mechanism 18 is provided on the top portion of the forward face of the support structure 16. The cutting unit movement mechanism 18 moves the cutting unit 14 in the Y-axis direction (indexing feed direction) and Z-axis direction (vertically).

The cutting unit movement mechanism 18 includes a pair of Y-axis guide rails 20 that are arranged on the forward face of the support structure 16 and run parallel to the Y-axis direction. A Y-axis movement plate 22 making up the cutting unit movement mechanism 18 is arranged on the Y-axis guide rails 20 in a slidable manner. A nut section (not shown) is provided on the rear face side (backward face side) of the Y-axis movement plate 22. A Y-axis ball screw 24 that runs parallel to the Y-axis guide rails 20 is screwed into the nut section. The Y-axis ball screw 24 has its one end portion coupled to a Y-axis pulse motor (not shown). As the Y-axis ball screw 24 is rotated by the Y-axis pulse motor, the Y-axis movement plate 22 moves in the Y-axis direction along the Y-axis guide rails 20.

A pair of Z-axis guide rails 26 that run parallel to the Z-axis direction are provided on the front face (forward face) of the Y-axis movement plate 22. A Z-axis movement plate 28 is arranged on the Z-axis guide rails 26 in a slidable manner. A nut section (not shown) is provided on the rear face side (backward face side) of the Z-axis movement plate 28. A Z-axis ball screw 30 that runs parallel to the Z-axis guide rails 26 is screwed into the nut section. The Z-axis ball screw 30 has its one end portion coupled to a Z-axis pulse motor 32. As the Z-axis ball screw 30 is rotated by the Z-axis pulse motor 32, the Z-axis movement plate 28 moves in the Z-axis direction along the Z-axis guide rails 26.

A cutting unit 14 is provided under the Z-axis movement plate 28 to cut the workpiece 11. A camera 34 is provided adjacent to the cutting unit 14 to image a front face A side of the workpiece 11. With using the cutting unit movement mechanism 18, when the Y-axis movement plate 22 is moved in the Y-axis direction, the cutting unit 14 and the camera 34 are fed for indexing, and when the Z-axis movement plate 28 is moved in the Z-axis direction, the cutting unit 14 and the camera 34 rise and fall. The cutting unit 14 includes an annular cutting blade 36 fitted to one end of a spindle (not shown) that makes up a rotation shaft that runs parallel to the Y-axis direction. A rotation mechanism such as motor (not shown) is coupled to the other end of the spindle, thus allowing the cutting blade 36 to rotate.

In the alignment method according to the present embodiment, using the registration workpiece 11a, the storage step is performed first to store positions of the alignment marks 17 and positional relationships of the scheduled division lines 13 with the alignment marks 17. In the storage step, the registration workpiece 11a is placed on the chuck table 10 first so that the rear face side of the registration workpiece 11a and the holding face 10a of the chuck table 10 face each other with the adhesive tape 21 put therebetween. Next, the frame 23 is gripped with the clamps 12, thus causing a negative pressure of the suction source to act on the holding face 10a. As a result, the registration workpiece 11a is sucked and held by the chuck table 10 with the front face A side exposed upward. After the registration workpiece 11a has been sucked and held by the chuck table 10, areas near the both ends of each of the scheduled division lines 13 are imaged by the camera 34, thus forming captured images that include the alignment marks 17 arranged at the both end portions of each of the scheduled division lines 13. As a result, a captured image which includes, for example, the alignment marks 17a and 17b each positioned at the respective end portions of the first scheduled division line 13a or a captured image which includes the alignment marks 17c and 17e each positioned at the respective end portions of the first scheduled division line 13b is formed.

After the formation of captured images, the pattern (shape) and position (coordinates) of each of the alignment marks 17 are stored in the memory (not shown) of the machining device 2. More specifically, part (or whole) of each of the captured images including the alignment marks 17 is stored as a pattern image for use for pattern matching. Further, the position (coordinates) of each of the alignment marks 17 (pattern images) relative to the positions (coordinates) of the chuck table 10 and the camera 34 at the time of imaging is stored. Still further, the positional relationships of the scheduled division lines 13 with each of the alignment marks 17 are stored in the memory of the machining device 2. More specifically, the distance between the scheduled division lines 13 and each of the alignment marks 17 (pattern images), for example, is stored. The value measured on the machining device 2 by an operator or the design value of the workpiece 11 is used, for example, as the distance between the scheduled division lines 13 and each of the alignment marks 17. It should be noted that although a pattern (shape), position (coordinates), and positional relationship (e.g., distance) of the alignment marks 17 located at the both end portions of each of the scheduled division lines 13 are stored in the present embodiment, the storage step of the present invention is not limited thereto. Instead, for all the alignment marks 17 relating to each of the scheduled division lines 13, a pattern (shape), position (coordinates), and positional relationship (e.g., distance) may be stored.

After the storage step, the holding step is performed to hold the machining workpiece 11b that will be machined, with the chuck table 10. In the holding step, the machining workpiece 11b is placed on the chuck table 10 first so that the rear face side of the machining workpiece 11b and the holding face 10a of the chuck table 10 face each other with the adhesive tape 21 put therebetween. More specifically, the machining workpiece 11b is placed at a position similar to where the registration workpiece 11a was placed. Here, the term "similar position" refers to a position that is close to an extent which prevents erroneous detection of the adjacent alignment marks 17. Then, the frame 23 is gripped with the clamps 12, thus causing a negative pressure of the suction source to act on the holding face 10a. As a result, the machining workpiece 11b is sucked and held by the chuck table 10 at a position similar to that at which the registration workpiece 11a was placed with the side of the front face A exposed upward.

After the holding step, the detection step is performed to detect the alignment marks 17 of the machining workpiece 11b. In the detection step, the positions of the alignment marks 17 on the machining workpiece, the positions corresponding to the alignment mark positions stored in the storage step, are imaged with the camera 34, thus forming captured images of the machining workpiece 11b. After the formation of captured images, pattern matching is conducted to detect the alignment marks 17 of the machining workpiece 11b included in the captured images. That is, the pattern most correlated to one of the pattern images stored in the storage step is detected as the alignment mark 17 of the machining workpiece 11b, thus finding the position (coordinates) of the alignment mark 17.

After the detection step, the identification step is performed to identify the positions of the scheduled division lines 13 of the machining workpiece 11b. In the identification step, the positions of the scheduled division lines 13 of the machining workpiece 11b are identified from the positions (coordinates) of the alignment marks 17 of the machining workpiece 11b detected in the detection step and the positional relationships (e.g., distances) of the scheduled division lines 13 with each of the alignment marks 17 stored in the storage step. As illustrated in FIG. 3, the alignment marks 17a and 17b for the first scheduled division line 13a of the machining workpiece 11b are formed uniformly and clearly. Therefore, the alignment marks 17a and 17b can be detected in the detection step, and the position of the first scheduled division line 13a of the machining workpiece 11b can be identified in the identification step.

On the other hand, although the alignment mark 17e for the first scheduled division line 13b of the machining workpiece 11b is formed uniformly and clearly, the alignment mark 17c is partially chipped. In the detection step, therefore, the alignment mark 17e can be detected, but not the alignment mark 17c. For this reason, in such a case, the other one of the alignment marks 17 adjacent to the alignment mark 17c on the center side of the machining workpiece 11b along the direction of extension of the scheduled division lines 13 is detected. That is, in the machining workpiece 11b shown in FIG. 3, an area located away from the alignment mark 17c to the center side of the machining workpiece 11b along the direction of extension of the first scheduled division line 13b is imaged with the camera 34, thus detecting the adjacent alignment mark 17d. The area to be imaged with the camera 34 can be determined based, for example, on the design value of the workpiece 11. As a result, the positions of the two alignment marks 17d and 17e required to identify the position of the first scheduled division line 13b can be found. This makes it possible to identify the position of the first scheduled division line 13b of the machining workpiece 11b by performing the identification step without stopping the machining device 2.

As described above, if one of the alignment marks 17 of the machining workpiece (second workpiece) 11b cannot be detected at the position of one of the alignment marks 17 stored in the storage step, the alignment method according to the present embodiment detects other adjacent one of the alignment marks 17 on the center side of the machining workpiece 11b along the direction of extension of the scheduled division lines 13, thus enhancing the likelihood of detection of the alignment marks 17 and keeping reduction in productivity to a minimum.

It should be noted that the present invention is not limited to the above embodiment and may be modified in various ways. For example, the workpieces 11 that are rectangular in plan view are used in the present embodiment. However, the workpieces 11 may be formed to be circular in plan view. Further, although provided in each of the devices 15 in the present embodiment, each of the alignment marks 17 may be arranged, for example, close to intersections between the scheduled division lines 13. Further, although a description has been made primarily of the steps for identifying the positions of the first scheduled division lines 13a and 13b and so on in the present embodiment, the present invention is not limited thereto. The positions of the second scheduled division line 13c and so on can be identified by similar steps.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. An alignment method for identifying positions of first scheduled division lines on a workpiece provided with devices each formed in each of areas partitioned by a plurality of first scheduled division lines and a plurality of second scheduled division lines that intersect the first scheduled division lines, by detecting alignment marks each arranged in each of the areas, said alignment method comprising:

a storage step adapted to image a first workpiece held by a chuck table and store positions of the alignment marks corresponding to the first scheduled division lines and positional relationships of the first scheduled division lines with the alignment marks;

a holding step adapted to hold a second workpiece corresponding to the first workpiece with the chuck table after said storage step;

a detection step adapted to image positions of the alignment marks on the second workpiece, the positions corresponding to the alignment mark positions stored in said storage step, and detect the alignment marks of the second workpiece after said holding step; and an identification step adapted to identify positions of the first scheduled division lines of the second workpiece after said detection step on the basis of the detected positions of the alignment marks of the second workpiece and the positional relationships of the first scheduled division lines with the alignment marks, the positional relationships being stored in said storage step, wherein if one of the alignment marks of the second workpiece cannot be detected at one of the alignment mark positions stored in said storage step, said detection step detects other adjacent one of the alignment marks on a center side of the second workpiece along a direction of extension of the first scheduled division lines.

* * * * *